Dec. 30, 1958　　　　　　　　R. L. LINCOLN　　　　　　2,866,518
APPARATUS FOR EQUALIZING PRESSURES IN MULTIPLE
　　　　　　　　　　　CYCLONE DUST COLLECTORS
Filed July 6, 1954　　　　　　　　　　　　　　3 Sheets-Sheet 1
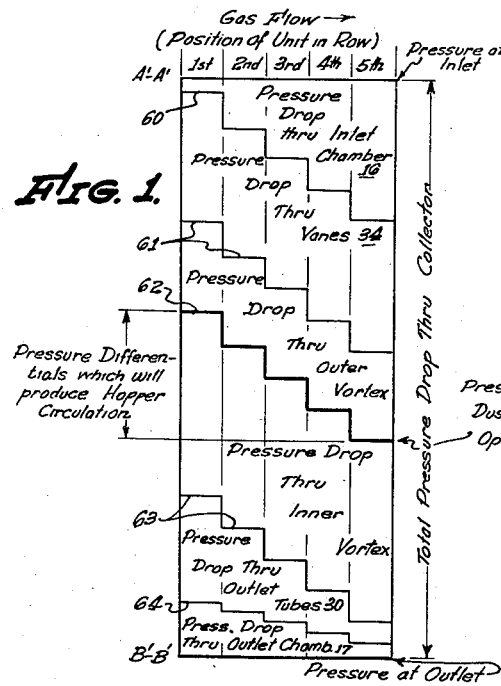
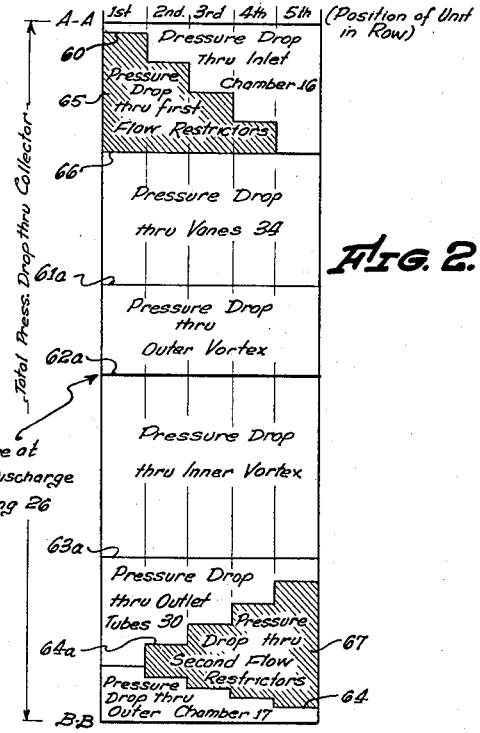
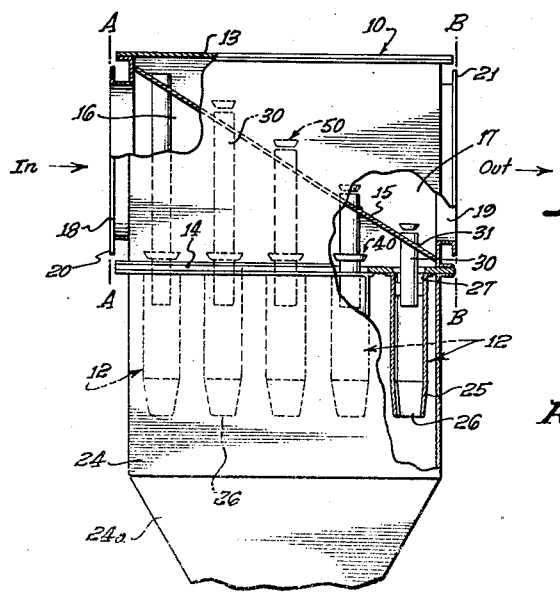
Roland L. Lincoln,
INVENTOR.
BY
Attorneys.

Dec. 30, 1958 R. L. LINCOLN 2,866,518
APPARATUS FOR EQUALIZING PRESSURES IN MULTIPLE
CYCLONE DUST COLLECTORS
Filed July 6, 1954 3 Sheets-Sheet 2
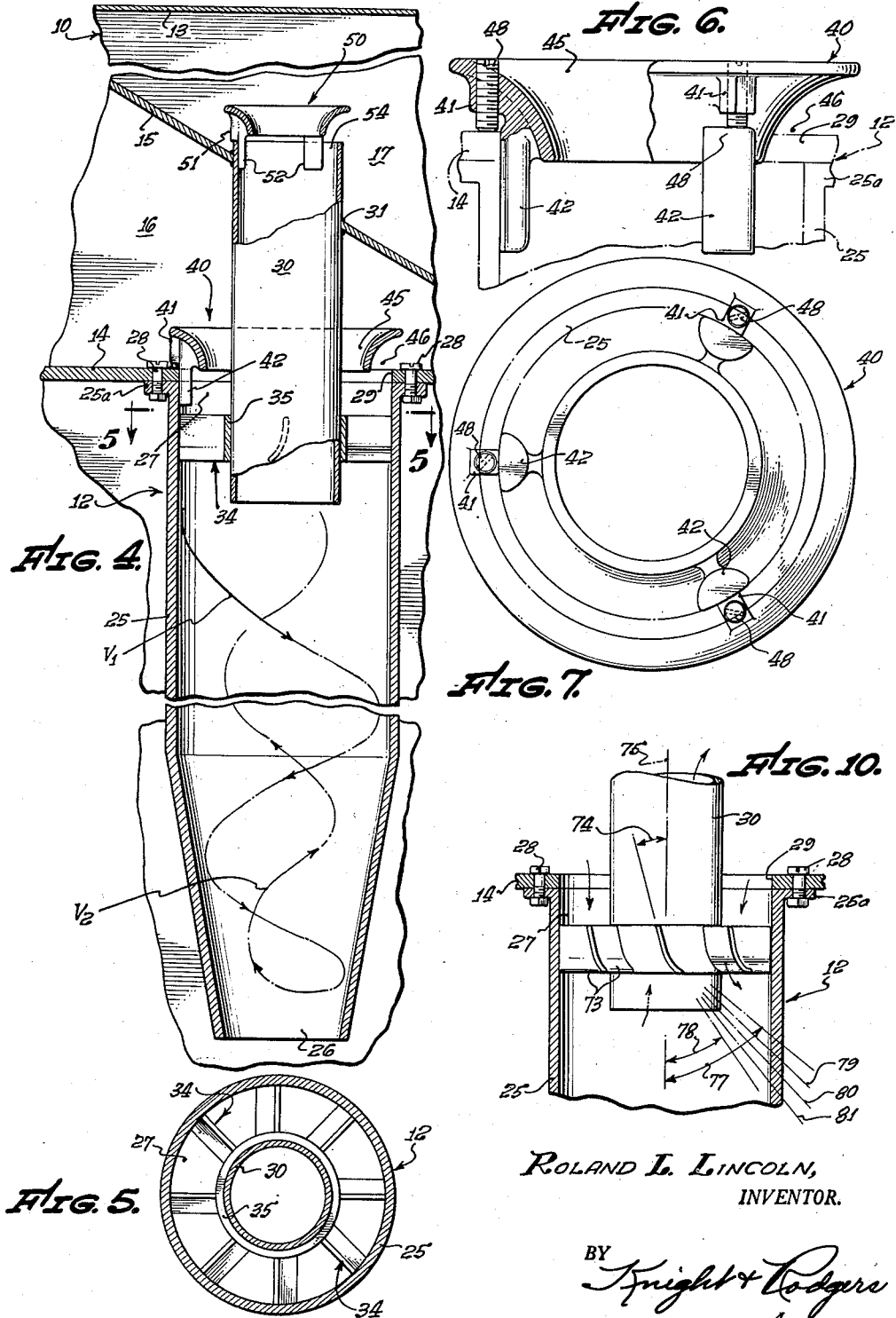
Roland L. Lincoln,
INVENTOR.
BY
Knight & Rodgers
ATTORNEYS.

Dec. 30, 1958
R. L. LINCOLN
2,866,518
APPARATUS FOR EQUALIZING PRESSURES IN MULTIPLE CYCLONE DUST COLLECTORS
Filed July 6, 1954
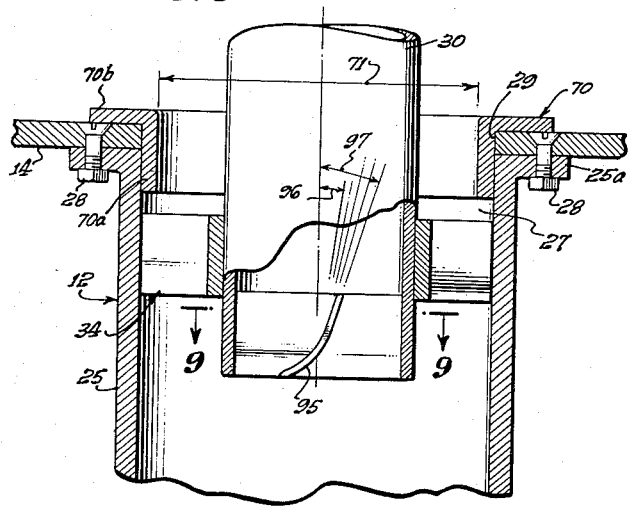
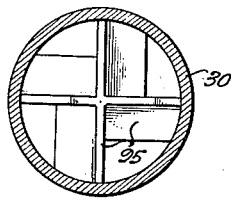
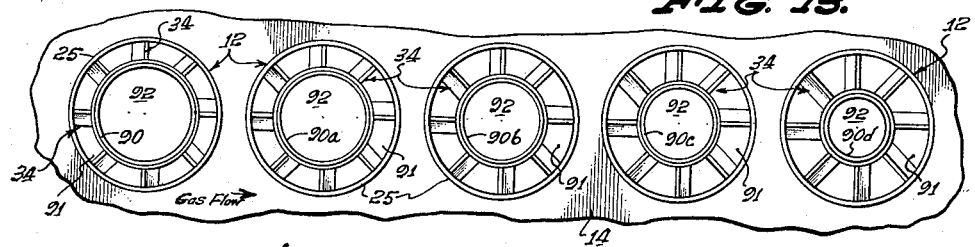
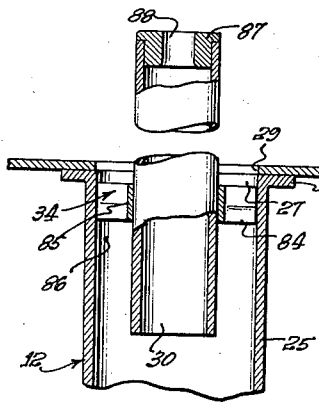
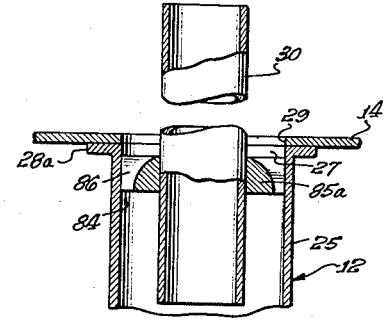
ROLAND L. LINCOLN,
INVENTOR.
BY
Knight & Rodgers
ATTORNEYS.

2,866,518

APPARATUS FOR EQUALIZING PRESSURES IN MULTIPLE CYCLONE DUST COLLECTORS

Roland L. Lincoln, Palos Verdes Estates, Calif., assignor to Western Precipitation Corporation, Los Angeles, Calif., a corporation of California Application July 6, 1954, Serial No. 441,560

11 Claims. (Cl. 183—33)

The present invention relates generally to dust collectors in which solid particles suspended in a gas stream are collected or removed from the gas stream by centrifugal action; and more particularly to dust collectors of the cyclone type in which a plurality of tubular collecting units are connected in parallel to inlet and outlet gas ducts and which discharge the collected dust into a common hopper.

As used herein, the term "dust collector" refers to the entire apparatus which comprises a plurality of similar collecting units. A "collecting unit" includes a separating tube, means for imparting a spinning motion to the gas entering the tube, and an outlet tube. To this combination I add certain flow restricting means, as will be described. The main gas stream entering the dust collector is termed the "primary gas stream"; and it is subdivided in the collector into a plurality of "secondary gas streams," one for each collecting unit. After leaving the collecting units, all secondary streams are ordinarily recombined to leave the dust collector as a single stream.

In a cyclone dust collecting unit, air or other gas carrying suspended particles is introduced into one end of a separating tube and passes means which impart a whirling or spinning action to the gas stream. As a result, the gas stream moves axially along the tube while spinning at a high rate and the suspended particles are thrown outwardly against the tube wall by centrifugal action. In dust collectors of the type with which we are particularly concerned here, the air then moves into an inner spiral of smaller diameter and reverses its direction of axial movement within the tube, leaving the separating tube through an outlet tube which is located at the same end of the separating tube as that at which the gas enters. The dust separated from the gas is discharged from the separating tube through an opening at the other end of the separating tube and passes into a hopper which is a common dust receiver for a large number of collecting units. Under ideal conditions there is little movement of gas out of the separating tube through the dust outlet, or at least the gas which does pass out through the dust outlet is quickly drawn back into the separating tube to pass out through the inner vortex.

However, these ideal conditions do not ordinarily exist; and instead there exists a problem which is commonly referred to as "hopper circulation." This is a general term applied to describing conditions in which a fraction of the gas stream entering one or more collecting units passes out of the collecting unit through the dust discharge opening and into the hopper. This fraction of the gas stream then flows through the hopper and leaves by entering the dust discharge opening of one or more other collecting units. This gas flow between units and within the hopper is caused by the fact that the gas pressures at the dust discharge openings of all the collecting units are not equal. This inequality causes a differential pressure between certain of the several collecting units that in turn causes a gas flow from units of higher pressure through the hopper to units of lower pressure.

It has been demonstrated that the difference in pressure between the dust discharge openings of a plurality of collecting units is a result of unequal resistance to flow encountered by the several secondary gas streams between the gas inlet to the collector and the individual dust discharge openings. All collecting units have their inlet ends connected to a common gas inlet chamber which is connected to a gas duct; and at the inlet to the inlet chamber the pressures at all points in the primary gas stream are substantial equal. However, various factors of a practical nature cause different resistances to flow to be encountered by the several subdivisions of the primary gas stream as the secondary streams pass through the collector. For example, it is seldom possible to have all the collecting units receive gas at exactly the same location in the inlet chamber. Consequently, as will be developed more fully, there are differences in flow resistance, and accordingly differences in pressure drop within the inlet chamber itself, between the initial location of equal pressure and the inlet of each collecting unit. Accordingly, even though each collecting unit is a duplicate of each other unit so that flow resistances within each unit are the same, each secondary gas stream encounters different resistances to flow by the time it reaches the dust discharge opening of its unit, thus creating pressure differentials between some dust discharge openings which in turn cause gas to flow through the hopper between units as mentioned.

The practical result of hopper circulation is a distinct loss in the collection efficiency of the entire dust collector, as compared with the efficiency of a single collecting unit. Collection efficiency as referred to herein is a fraction represented by the weight of material collected divided by the weight of material entering the collector, although it is more commonly expressed in terms of percentage in which case it becomes $$\frac{\text{collection}}{\text{input}} \times 100\%$$

By way of example, multiple cyclone dust collectors on industrial installations commonly have a collection efficiency in the range of 70–85%, although under favorable conditions they will exceed 90%.

There are at least two reasons why this so called hopper circulation reduces the over-all collection efficiency. The first is the re-entrainment of particles, which have once been separated, in the gas that flows through the hopper and into the dust discharge openings of certain tubes. The second reason is the fact there is a significant volume of gas flowing out of some collecting units and into other collecting units through the hopper with the result that the actual volume of gas passing through many of the collecting units is significantly removed from the volume for which the individual units were designed. Each individual collecting unit reaches its maximum efficiency at the designed rate of flow through that unit; and the efficiency of a unit decreases as the volume of gas flowing through that tube departs from the assumed rate of flow upon which the tube design is based.

Accordingly, it is a general object of my invention to improve the over-all collecting efficiency of a multiple cyclone dust collector.

It is also an object of my invention to eliminate the flow of gas in the hopper between units of a multiple cyclone dust collector by equalizing resistances to flow encountered by all the individual gas streams passing through the individual units.

It is a further object of my invention to equalize, in a collector having a plurality of cyclone units, the total resistance to gas flow over each and every path of the gas between a given location in a common inlet and the dust discharge openings of the units, and also between the dust discharge openings and a second location in a common outlet.

The above and other objects of my invention are attained according to my improved apparatus by introducing graded resistances to gas flow in the vicinity of the gas inlets of selected ones of a plurality of units operating in parallel. In some collectors this may be sufficient to achieve the desired results; but in the usual installation I preferably introduce graded resistances to gas flow in the vicinity of the gas outlets of selected units. The first resistances have a magnitude sufficient to equalize substantially the total resistances to gas flow over any path prior to reaching the dust discharge openings while the second mentioned resistances are sufficient substantially to equalize resistances to flow over any path between the dust discharge openings and the common gas outlet.

It may be assumed that the individual collecting units have been designed to offer the minimum resistance to gas flow through them, consistent with the objects to be achieved, so that resistance to gas flow through the collector as a whole is also at a minimum. However, because of inherent features of the design of a multiple unit collector, some of the secondary gas streams encounter relatively greater resistances to gas flow than others encounter. Since these greater resistances can seldom be reduced, my method is to equalize the resistance encountered by all the several gas streams flowing over various paths by increasing the resistance to gas flow where that resistance is less than the maximum. Accordingly, units in which the resistance to gas flow is the least, have the greatest amount of resistance added and units where the resistance is intermediate in degree, have a lesser amount of resistance added. The amounts added are such as to bring the total resistance encountered by each individual gas stream, and therefore the total pressure drop over each path, to approximately the same value.

In my improved apparatus, it is preferable to add to selected collecting units flow restricting means at or adjacent the inlet end of each separating tube. This flow restricting means is preferably of such character that it can be present or adjustably positioned in order to produce a predetermined amount of restriction to the flow of the secondary gas stream as it leaves the collector inlet chamber to enter the associated collecting unit, or shortly after entering the unit. A typical flow restricting means is an annular member spaced from the end of each separating tube which reduces the net gas inlet area of the tube from the net area without such restricting means. A greater degree of restriction is obtained by a greater reduction in the net gas inlet area of a particular unit. This flow restricting member is located upstream from the vanes where it does not interfere with or minimize the spinning movement of the gas stream produced by passage through the vanes.

In other forms of my invention the gas flow restriction may be incorporated in conventional parts, for example in the vanes producing the spinning motion of the gas. The vanes are made progressively different in successive tubes to obtain graded resistance to gas flow. Restriction is added to selected units in the sense that the resistance to flow is increased in some units over the basic amount at vanes which offer a minimum resistance.

Similarly, a preferred form of flow restricting means may, when required, be also located at or adjacent the outlet of selected collecting units where such means offers an adjustable resistance to gas flow for the stream of clean gas leaving each collecting unit. Such means may be at the discharge end of the outlet tube or it may be within the outlet tube. This second flow restricting means is adjustable to equalize the resistances to gas flow encountered by the secondary streams after they pass the dust discharge opening of a unit and before they reach a given location, such as the gas outlet from the collector, at which gas pressure throughout the entire recombined stream is substantially uniform. This is comparable to the restriction imposed by the first mentioned flow restricting means which is adjustable or variable to introduce a given resistance to gas flow between the collector inlet, at which gas pressure is substantially equal throughout the entire primary stream and the dust discharge opening of each collecting unit.

How the above objects and advantages of my invention, as well as others not specifically mentioned herein, are achieved will be better understood by reference to the following description and to the annexed drawings in which:

Fig. 1 is a conventionalized diagram showing the relative magnitudes of the pressure drops created by the several resistances to gas flow encountered by five gas streams passing through a collector having five parallel cyclone separating units of conventional design;

Fig. 2 is a diagram similar to Fig. 1 showing the corresponding pressure drops in the same five gas streams passing through a collector having five parallel cyclone collecting units modified according to my invention;

Fig. 3 is a side elevation of a multiple unit cyclone type dust collector, partly broken away, embodying a preferred form of my invention;

Fig. 4 is an enlarged vertical fragmentary median section through a single collecting unit showing flow-restricting means both at the gas inlet and at the gas outlet;

Fig. 5 is a transverse section on line 5—5 of Fig. 4;

Fig. 6 is a combined side elevation and vertical section of the flow restricting ring at the inlet end of the separating tube of Fig. 4, shown on a still larger scale;

Fig. 7 is a plan view of the flow restricting ring of Fig. 6;

Fig. 8 is a fragmentary vertical section through the upper end of a single collecting unit showing a variational form of my invention;

Fig. 9 is a horizontal section on line 9—9 of Fig. 8;

Fig. 10 is a view similar to Fig. 8 showing a still different form of my invention in which the graded resistance is obtained by varying the angle of the vanes;

Figs. 11 and 12 are fragmentary vertical median sections through the upper end of a single collecting unit showing comparative sizes of flow restricting means at the inlet to the separating tube and at the outlet tube, embodying another form of my invention; and Fig. 13 is a fragmentary horizontal section taken in the same plane as Fig. 5 showing diagrammatically still another form of my invention in which the diameter of the outlet tube is varied to obtain the desired degree of flow restriction.

Referring now to the drawings, there is shown in side elevation in Fig. 3 a typical dust collector comprising a plurality of cyclone type units. The collector comprises housing 10 which encloses a plurality of individual dust collecting units 12. The housing not only performs the function of confining and directing the gas stream but also confines and retains the suspended particles after they are separated from the gas. Housing 10 is divided horizontally by header plate 14 into an upper section and a lower section. The section above header plate 14 and below top wall 13 is in turn subdivided into two chambers by the slanting tube sheet 15, these being inlet chamber 16 and outlet chamber 17. Chambers 16 and 17 are each respectively in communication with gas inlet opening 18 and gas outlet opening 19 through which the entire gas stream enters and leaves the collector. Since the collector is ordinarily connected to some conventional type of gas inlet duct, not shown, through which the primary gas stream is conducted to the collector, inlet 18 lies in plane A—A and is normally surrounded by a flange 20 to which the inlet duct is attached. Likewise a similar flange 21 surrounds outlet 19 lying in plane B—B so that a second or outlet gas duct (not shown) may be connected to the collector at the outlet side in order to lead the cleaned gas stream away from the collector; however under some circumstances, it may be satisfactory to omit an outlet duct and have the gas stream leaving through gas outlet 19 discharge directly to the atmosphere.

The lower section 24 of housing 10 beneath header plate 14 provides an enclosed hopper for receiving separated dust or suspended particles, as will be more fully explained. The upper part of the hopper has vertically extending side walls, while the lower portion of the hopper has inclined walls 24a which converge to a bottom opening, not shown in the drawings, through which dust accumulated in hopper 24 may be removed from the collector. Collector housings of this construction are well known in the art and need not be described here in detail. Reference may be had to Bowman Patent 2,370,444, issued February 27, 1945, for further disclosure of a similar housing structure.

The dust collector includes a plurality of cyclone type collecting units 12. The detailed construction of one unit is shown in Figs. 4 and 5. Each unit comprises a separating tube 25. Although the exact shape of the tube is subject to some variation, the tubes herein illustrated are typical and each comprises an upper cylindrical and a lower frusto-conical section making the tube circular in transverse sections. Tubes 25 are open at both ends, the lower open end 26 constituting the dust discharge opening or outlet while gas carrying suspended particles to be separated is admitted to the tube at its upper or inlet end 27. Each tube is arranged with its axis vertical, or substantially so, and is suspended from horizontal header plate 14 by any suitable type of attaching means. A typical arrangement may be seen in Fig. 4 where each tube 25 is provided at its upper end with an outwardly extending flange 25a through which pass a number of bolts 28 to fasten the tube to header plate 14. The open upper end 27 of the tube is in alinement with an opening 29 in plate 14 which affords access by the gas stream to the upper end of the tube.

Mounted concentrically with separating tube 25, and of considerably smaller diameter, is outlet tube 30. The outlet tube is suspended from inclined tube sheet 15 and is connected thereto by any suitable means, for example by welding indicated at 31. Outlet tube 30 extends axially into the open upper end of separating tube 25 for a short distance, as shown in Fig. 4, and provides a means for discharging clean gas from the tube into outlet chamber 17 above tube sheet 15.

Outlet tube 30 may be used conveniently as a means for supporting in the upper end of tube 25 suitable spin producing means, such as the vanes indicated at 34. Vanes 34 extend radially outward from vane ring 35 which surrounds the lower end of outlet tube 30 and serves to position the outlet tube concentrically in separating tube 25. Vanes 34 are all similarly inclined so that the gas stream moving axially downwardly within tube 25 is given a spinning movement about the axis of the tube as the gas passes over the vanes. Except as mentioned later herein, the exact shape of these vanes is not limitative upon the present invention.

Except for the fact that some units 12 have longer outlet tubes 30 than others, as may be seen in Fig. 1, because of the inclination of tube sheet 15, the collecting units 12 are all constructed alike, as just described. Also, the construction of these units as thus far described is conventional and well known.

In order to carry out my improved method, as will be discussed below, there is located at the inlet end of each tube 25 a suitable type of flow restricted means, one form of which, shown in Figs. 4, 6 and 7, is ring 40. Ring 40 is mounted concentrically with tubes 25 and 30 at the gas inlet end of collecting unit 12. A ring 40 preferably, though not necessarily, has a curved profile when viewed in radial cross-section, as in Fig. 4, and is provided with a plurality of downwardly extending projections or legs 41 which rest upon header plate 14, or upon the end of tube 25, in order to support the ring in place. There are preferably three such legs 41. Preferably adjoining these legs, there is provided a plurality of projections 42, which extend downwardly below legs 41 into the upper end of tube 25. The purpose of these latter projections is to engage the inner surface of tube 25 and position ring 40 concentrically of the separating tube.

The ring 40 divides the total area through which gas may enter tube 25 into two annular passageways 45 and 46, one of fixed and one of variable area. The inner passageway 45 is the space immediately around outlet tube 30 and inside ring 40, the effective dimension of this passage being the difference between the outside diameter of tube 30 and the minimum inside diameter of ring 45. The size of this passageway is fixed. The other passageway 46 is the annular space between the outside of ring 40 and the inside surface of openings 29 and 27. Opening 29 in the header plate is preferably the same diameter as the inner diameter of tube 25. When this is the case, the net area of passage 46 is determined by the minimum spacing between the ring and plate 14 which in turn is determined by the length of legs 41, so that the net effective size of passage 46 is adjusted by varying the length of legs 41. Legs 41 can be made originally to a desired length or they can be subsequently ground or machined to reduce them to a desired length.

There is shown in Figs. 6 and 7 means of easily providing adjustability for the area of passageway 46. For this purpose, each fixed leg 41 of ring 40 is replaced by a vertically movable screw 48 which engages the upper face of plate 14. Screws 48 are legs of variable length. By turning screws 48 to extend them a greater or lesser distance, the effective length of the legs is increased or decreased, and the net area of passageway 46 can be thereby increased or decreased accordingly.

The total inlet area for gas entering a collecting unit 12 is divided between passages 45 and 46. Passage 45 is fixed in size or area; but the total net inlet area available at any inlet can, within limits, be controlled by adjusting the net area of passage 46. Obviously, reducing the area of passage 46 increases the flow resistance encountered by gas entering a given collecting unit.

A second similarly constructed flow restricting ring 50 is placed at the upper or outlet end of tube 30. Ring 50 is supported upon and above the upper end of tube 30 by a plurality, preferably three, of legs 51 which rest upon the upper end of tube 30. A plurality, preferably three, of centering lugs 52 attached to ring 50 project downwardly inside tube 30 to engage the inner surface of the tube. These lugs locate the flow restricting ring concentrically of the outlet tube.

Ring 50 divides the total area through which gas leaves tube 30 into two separate portions. One of these portions is the circular area within ring 50 and is fixed in size. The remainder of the total area is the annular area 54 between the outside of ring 50 and the upper end of tube 30. The size of this annular area is variable and is determined by the length of supporting legs 51. As ring 50 is lowered by shortening legs 51 it approaches the upper edge of tube 30, and the size of area 54 decreases. If desired, ring 50 may be supplied with suitable means for adjustably spacing the ring above the tube, such as screws 48 shown in Fig. 6.

Since the total outlet area for the gas leaving a collecting unit 12 through tube 30 may be considered as being the sum of the fixed area inside ring 50 and the variable area 54 outside the ring, a decrease in area 54 decreases the total area through which the gas stream flows. Of course, a reduction in area 54 (and in the total area) increases the resistance to gas flow at the outlet from that collecting unit.

Each tube 25 has a relatively small diameter, a typical size being a tube of nine inch diameter. Since the volume of gas which can be passed through a tube of this size is comparatively small, the dust collector 10 has a plurality of dust collecting units each with a separating tube of the same relatively small diameter. The total number of units depends on the size of the primary gas stream, each unit 12 being designed to handle a given flow which has been found to result in maximum collection efficiency. In a dust collector, these individual cyclone units operate in parallel with each other and as many are used as may be required to handle the total of gas flow of the primary stream. In actual practice this may mean there are several hundred units operating in parallel in a single collector.

The individual collection units 12 are usually arranged in a rectangular pattern. For example, if there are assumed to be forty tubes in a given collector, these may be arranged in eight rows of five tubes each. Each row extends parallel to the direction of the incoming gas stream, and there are eight such rows arranged side-by-side in a direction transverse to the gas stream. Viewed from one side, a collector with forty separating units arranged in this rectangular pattern will then appear as in Fig. 3. Viewed solely from the standpoint of the most economical arrangement and the smallest size of collector, the individual units would be arranged in a square pattern, or substantially so. However, other factors may dictate, or at least influence, the over-all shape of the collector. For example, it is desirable to have the rows as short as possible in the direction of entering gas flow. Accordingly, where possible, the longer dimension of the collector is arranged transverse to the direction of gas flow.

The total pressure drop as the gas passes through the collector can be broken down into its components which can then be studied and compared individually. To assist in an understanding of my invention, there will first be discussed pressure drops as found in a dust collector of conventional construction, which are shown diagrammatically in Fig. 1. The component pressure drops will then be compared with those present in my improved construction as shown in a similar manner in Fig. 2.

It has been a basic assumption in design of dust collectors of this type that the total flow of the primary stream is divided equally among all the several collecting units. Thus the number of tubes is determined by dividing the total rate of gas flow in the primary stream by the optimum rate of flow through each collecting unit at a given pressure drop across the collector, that is between inlet 18 and outlet 19. I propose to show that this basic assumption is unjustified and that in conventional designs the rate of flow through all units 12 is in fact significantly unequal.

Referring now to the diagram in Fig. 1, the pressure existing substantially uniformly throughout the primary gas stream as it enters inlet 18 and passes plane A—A is indicated by the horizontal line A'—A'. This line is raised above some datum plane, which may conveniently be atmospheric pressure as indicated by the line at the bottom of the figure. This is the ordinary condition in which all pressures in the dust collector are above atmospheric, but this is not a necessary condition. Since the presence of resistance to gas flow causes a decrease in the pressure existing in the gas, the pressure drops across various parts of an individual collecting unit are shown qualitatively in Fig. 1 as distances below the line A'—A'. As a basis for this discussion, equal volumes of gas per unit time are assumed to flow through each collecting unit. Since my example assumes there are five individual collecting units 12 in each row of units extending in the direction of flow of the entering gas stream, Fig. 5 shows pressure drops arranged in five columns which correspond respectively to the five units of the row, numbered progressively from the gas inlet.

Shortly after entering inlet chamber 16, a portion of the primary gas stream enters the first tube in the row, becoming one of five secondary streams; and this portion encounters in the inlet chamber the minimum resistance to flow of any gas passing through the inlet chamber. That portion of the gas stream which ultimately enters the last tube in the row encounters the greatest resistance to flow during its movement through the inlet chamber; while the second, third and fourth tubes receive gas which has encountered intermediate amounts of resistance. In general, pressure drop within the inlet chamber is caused mostly by the presence of outlet tubes 30 extending through this chamber and also by a certain amount of turbulence at the inlet to each tube. It is thus evident that pressure drop within the inlet chamber is roughly in proportion to the length of the gas path through the inlet chamber and is therefore increasingly greater for successive units 12 further removed from inlet 18 in the direction of gas flow. The increment of pressure drop is approximately equal between each two successive tubes in the row with the result that the pressure at the inlet of each collecting unit may be represented by the stepped line 60. The distance that the line 60 is below line A'—A' thus represents the pressure drop in a secondary gas stream flowing through a particular one of the separating units.

As each secondary gas stream passes over vanes 34 which impart a spinning motion to the gas stream, the gas encounters an additional resistance to flow. The pressure drop caused by this resistance may be represented by the space between the lines 60 and 61 in Fig. 1. Since the vanes in all tubes are alike it may be assumed that the pressure drop in each of the separating tubes is equal and therefore the line 61 is stepped to be in all units the same distance below line 60.

The next component pressure drop in each unit 12 occurs within the outer or larger diameter vortex as the gas spins downwardly within the tube from vanes 34 to a position near dust discharge opening 26. Here again, conditions are substantially uniform in each of the collecting units and therefore it may be assumed that pressure drop through this vortex within each unit is the same. Accordingly, line 62, which represents the pressure in the gas stream at the dust discharge opening 26, is below line 61 by a distance which is equal in all units.

At this point it should be noted that the pressure at the dust discharge opening of the first unit in the row is higher than the pressure at the dust discharge opening of the next unit. Likewise the second is higher than the third and so on progressing along the row. Hence, between any two units in the row, there is a pressure differential which causes hopper circulation between successive units. Since the gas pressure is lowest at the last tube in the row, the tendency is for gas to flow out of openings 26 of the first units of the row and into the last units of the row, particularly the fifth in the example which we are here considering. Conventional design practice has not recognized this hopper flow between tubes as being of any consequence and so has ignored it in design.

As the whirling gas within separating tube 25 reverses its direction, it moves upwardly in an inner vortex of smaller diameter. Here it encounters the next drop in pressure. This pressure drop again is assumed to be equal in all of the tubes because conditions are designed to be uniform. Accordingly, line 63 which represents the pressuure of the five individual secondary gas streams as they enter their respective outlet tubes 30, is everywhere equally spaced below line 62.

The resistance to gas flow encountered by the secondary streams as they pass through the outlet tubes differs between units because the length of the outlet tubes is not uniform. In general, pressure drop through an outlet tube is proportional to the length of the outlet tube and is therefore greatest for the first collecting unit in the row having the longest tube 30, decreasing with successive units in the row to a minimum for the fifth unit. This condition is reflected in Fig. 1 by the location of line 64 which indicates the pressures existing at the outlet ends of the several tubes 30. The distance between lines 63 and 64 indicating pressure drop is greatest at the first unit in the row and least at the fifth unit, with intermediate values for intermediate units.

The final component pressure drop is that as the gas streams flow through outlet chamber 17. Herein all the secondary streams are re-combined into a common stream which leaves the collector through outlet 19. As the common gas stream passes plane B—B at the outlet, it may be assumed that pressure throughout the re-combined secondary gas streams is substantially uniform and therefore the line B'—B' in Fig. 1 is shown as a horizontal line. The space between it and line 64 represents the pressure drop in the various secondary streams as they flow through the outlet chamber. The greatest drop will be that in the gas stream leaving the first unit of the row, since it has the farthest to flow and also it has a more turbulent condition because of its position in the outlet chamber. The second, third and successive units being closer to the outlet, their gas streams have progressively less pressure drop in the outlet chamber.

Since the pressure drop between collector inlet 18 and any dust opening 26 depends upon the path followed by the gas to reach the latter location and is not equal for all paths, as is shown by the steps in line 62, equal volumes of gas as initially assumed do not enter all five tubes 25 in a typical row of collecting units. The units closer to inlet 18 receive somewhat more gas than their proportional share because of their relatively lower pressure drop between inlet 18 and dust opening 26; while the units farther away from the inlet receive less than their share of gas because of their relatively higher pressure drops. The unequal pressures existing at the several dust outlets 26 cause a transfer of gas through hopper 24 from openings 26 at higher pressures to openings 26 at lower pressures. Hence, some units 12 lose gas at their dust outlet openings and others receive gas there because such units, operating in parallel, are connected at their point to a common chamber, the dust receiving hopper.

As a result of hopper circulation the rate of gas flow in any unit downstream from its opening 26 may be substantially different than the rate of flow upstream of this opening. Collecting units farther from collector inlet 18 have more than their proportional share of gas flowing in them between opening 26 and the exit end of outlet tube 30. Similarly units closer to inlet 18 have less than their proportional share of gas flowing over this same part of the gas path. The net result is to cause each unit to operate under conditions which are sufficiently removed from the designed conditions giving peak efficiency that the efficiency of the dust collector as a whole may be materially less than the efficiency for a single collecting unit at optimum conditions.

Gas flow through all units can be equalized if the resistances to flow, and thus the pressure drops, in each unit are the same. When this is true, pressures at the dust openings 62 are all equal and the total pressure drops upstream and downstream from this reference pressure are likewise equal respectively. Accordingly, I equalize the total resistance to flow encountered over any flow path by the secondary gas streams and thereby equalize the pressures at the dust outlets of the collecting unit. More specifically, this involves introducing preselected amounts of resistance to flow into selected collecting units either upstream from the dust outlet openings or downstream from said openings, or at both locations, the quantity of resistance so introduced being sufficient to equalize this total resistance for all units.

As indicated in Figs. 1 and 2, each collecting unit has the same pressure drop across the vanes and also across the outer vortex. The only unequal resistance between collector inlet 18 and dust discharge outlet 26 is the resistance encountered within the inlet chamber. Since this pressure drop cannot be decreased over any path of the gas, I add properly selected amounts of resistance at the inlets of selected units, as indicated by the upper shaded area 65 in Fig. 2. Since the resistance of the inlet chamber is the least for the first unit, the greatest amount of added resistance is introduced into the path of gas flowing through this first unit. A smaller amount is introduced into the path of the gas stream flowing through the second unit, and likewise a still smaller amount into the path of the gas stream going through the third unit, the amount so introduced decreasing progressively in successive units of the row in the direction of gas flow. The amount of resistance introduced into the path of the gas stream in the last or fifth unit is zero. This minimizes the total resistance introduced into each of the units; but it is realized that if additional resistance were introduced into the fifth unit that the resistance introduced into each of the previous units would be increased by that same amount.

Since this resistance to gas flow is introduced ahead of or upstream from vanes 34, it is most conveniently introduced at the gas inlet ends of the collecting units by means of rings 40, previously described. The amount of resistance selected for each unit is such that the total pressure drop through the inlet chamber and through the first flow restricting means 40 is the same for all gas streams passing through any of the collecting units. The result is that the pressure existing at entry to vanes 34 is substantially uniform in all collecting units, as indicated by the horizontal line 66 in Fig. 2.

When the pressure at this point is equal in all tubes, then lines 61 and 62 likewise become horizontal lines in the diagram as are lines 61a and 62a respectively in Fig. 2. As a result of introducing these resistances graded in amount into the paths of the gas streams flowing through the several units, the gas stream in every unit encounters substantially the same resistance to flow. The corresponding component pressure drops are equal and the pressures at the discharge openings 26 are all the same.

Although the existence of equal pressures at the outlets 26 of all the collecting units in the row is dependent upon the equality of resistance to flow upstream from this point, pressures at this point are also dependent upon equality of flow resistance downstream from this point. For this reason, the total resistance to flow encountered by any one of the secondary gas streams after passing the dust outlets is also equalized. In the particular construction of dust collector here under discussion, the resistance of the inner vortex is the same for all units but the flow resistance in the outlet tubes and in the outlet chamber differs from unit to unit in one row. These latter resistances are greatest for the first unit in the row and least for the last unit, having intermediate values for intermediate tubes.

This condition is shown in Fig. 2 by line 63 becoming horizontal line 63a parallel to line 62a while the pressure at the outlet ends of tubes 30, formerly represented by line 64 in Fig. 1 is now line 64a which steps up from the first to the last tube. Line 64 also represents the pressure at the beginning of the flow path through the outlet chamber and so appears in Fig. 2 at the same position as in Fig. 1 as no change has been made in pressure drop in the outlet chamber.

I introduce a second set of added resistances to gas flow into selected units, these resistances being graded in amount so that they are able to substantially equalize the total pressure drop in each unit between the entrance end of outlet tubes 30 (line 63a) and common gas outlet 19 or the plane B—B. Since the other resistances are greatest in the first unit, the amount to be added to it may be considered as zero while larger amounts are added to the second, third, fourth, and fifth units, increasing progressively in the direction of gas flow as indicated by the vertical extent of lower shaded area 67 in Fig. 2.

Introduction of the second graded resistances to gas flow downstream from dust openings 26 may be accomplished by introducing the resistance into each gas path at the exit end of outlet tubes 30 by means of rings 50. One ring is mounted on the upper end of each outlet tube. The mere presence of a ring 50 at this position with passage 54 set for maximum opening, introduces into the path of the gas stream at this point the minimum resistance. This resistance to flow, and the corresponding pressure drop, is increased by shortening legs 51, so that ring 50 approaches more closely the upper end of tube 30. The maximum restriction possible for a ring 50 occurs when the area of passage 54 is reduced to zero and all the gas leaves through the circular open area in the center of ring 50. Considerable variation in the amount of resistance to gas flow introduced by ring 50 may be obtained.

It should be pointed out that this second flow restricting means at the outlets from the collecting units is not required in all types of collectors. In some instances, the design of the collector can be altered from that shown so that a uniform resistance to flow is encountered by the gas over-all paths after passing dust discharge openings 26. For example, it will be understood without further illustration how this could be accomplished with the structure in Fig. 3 by omitting sloping tube sheet 15 and extending all the tubes 30 to the same length so that all tubes 30 pass through top plate 13 and discharge directly to the atmosphere. Each outlet tube now offers the same resistance to gas flow. Flow resistance downstream from dust discharge openings 26 is composed only of the resistance of the inner vortex and the resistance of the outlet tubes. These components of the total resistance being equal in each collecting unit, the pressure drop from 62a to 64a in Fig. 2 is the same for all units as for the first unit and is equalized because of the design of the collector. Under these circumstances, no added flow restricting means are needed at the clean gas outlets from the collecting units.

There is shown in Fig. 8 a variational form of flow restricting means applied to the gas inlet end of the collecting units. This form of flow restricting means consists of a collar 70 which is angular when viewed in cross-section as in Fig. 8. Ring 70 has a cylindrical portion 70a sized to slide with minimum clearance into the open end 27 of separating tube 25 and a flat outstanding flange 70b at the upper end of the collar which rests upon header plate 14. The effective inlet area for the incoming gases is the annular area outside tube 30 and inside collar 70 whose inner diameter is indicated at 71. Collar inside diameter 71 being less than the inside diameter of tube 25, the collar restricts gas flow into the separating tube. A graded restriction is afforded by furnishing collars of different radial thickness since a larger or smaller net area for the gas inlet to a unit is thus provided.

A third form of flow restricting means for use at the inlet end of the separating tubes is illustrated in Fig. 10. In this embodiment the graded resistances are incorporated in the vanes 73 which are modified from one unit 12 to the next in a row in order to provide a variable resistance to flow in each of the successive collecting units of the row. Vanes 73 change the direction of gas flow. As the gas strikes the vanes it is moving mainly in the direction of the axis of separating tube 25; and by impingement on vanes 73 the gas is given a tangential component of motion so that it moves downwardly within the tube, following a spiral path. The resistance to flow offered by these vanes is a function of the change in direction they impart to the gas stream, the least resistance being offered when they effect a minimum change in direction.

Although the invention is not necesarily limited to any particular shape of vanes, the vanes as herein illustrated are curved in a vertical arc when viewed endwise in elevation. The vane surface at the upper or leading end of each vane lies at a relatively small angle 74 to the vertical axis 75 of the tube while at the lower or trailing edge of the vane this guiding surface makes a greater angle 77 with the axis of the tube. The greater the vane angle at the trailing edge, the greater the amount of spin produced in the gas stream and the greater the resistance to gas flow. Conversely, the smaller the vane angle at the trailing edge, the less the resistance offered to gas flow.

In order to use this form of my invention, this angle 77 of the gas directing surface of the vane at the trailing edge of the vane, is changed progressively in the several tubes in a row. For example, the first unit in Fig. 2, in which it is desired to introduce the maximum amount of resistance would have the maximum angle 77. The last or fifth unit in the row, which requires the least amount of flow resistance in it would then have the smallest angle for the trailing edge of the vanes, as indicated at 78 in Fig. 10. Intermediate angles as indicated at 79, 80, and 81 would be used for the vanes in the second, third and fourth units respectively of the row.

The result of this vane construction is that the flow resistance offered by the vanes and the pressure drop across them are no longer equal in all units; and the difference between pressure drops at vanes in successive units is calculated to compensate for the difference in pressure drops in the gas streams as they pass through the inlet chamber. By referring to Fig. 2, this condition may be explained graphically by assuming that the vertical dimension of shaded area 65 at the top of the diagram, representing pressure drop of the first flow restrictors, is added to or becomes a part of the vertical dimension just below it representing the pressure drop at the associated vanes. As a result, in a diagram of pressure drops in a collector according to Fig. 10, the line 66 of Fig. 2 is eliminated and the pressure drop across the vanes is then represented by the vertical distance between lines 60 and 61a in Fig. 2, for the successive collecting units in the row.

Of course, there are various other ways of introducing flow resistance in predetermined graded amounts at or near the inlet end of each of the collecting units. Another means for progressively constricting flow at the inlet of each individual separating tube is shown in Figs. 11 and 12, such means differing from the method and means of Fig. 8 chiefly in that it is located at the spin producing vanes instead of ahead of them. In Fig. 11 the vanes 84 are attached to vane ring 85 by which the vanes are supported upon outlet tube 30. Vane ring 85 has a relatively small radial dimension and therefore offers a minimum resistance to flow of gas in the annular space 86 between it and the inner surface of separating tube 25. Increasing the outside diameter or radial thickness of ring 85 reduces the area of the annular space 86, adding to the resistance to flow of the gas at this location. By increasing the outer diameter of ring 85 in suitable increments, graded resistances can be introduced in the required amounts. The vane ring 85a illustrated in Fig. 12 offers a high degree of resistance to gas flow past it and thus produces a relatively high pressure drop across the vanes. A ring of this design offers a degree of resistance suitable for the first tube in a row where a maximum pressure drop is desired; and successive vane rings in the second, third and successive tubes would then have outside diameters intermediate between ring 85a of Fig. 12 and ring 85 of Fig. 11.

Figs. 11 and 12 also show variational means for introducing flow resistance at the gas outlet of a collecting unit 12. In the first unit of a row, no additional resistance is required and accordingly outlet tube 30 is typically a straight tube of uniform diameter as shown in Fig. 12. However, the last tube in the row requires the maximum degree of flow resistance and has added to it a flow restricting collar 87 having gas passage 88. This collar fits snugly within outlet tube 30 and may be held in place by any suitable means, as by an outstanding flange which supports the collar by engagement with the upper end of tube 30. This construction is generally similar to the flow restricting collar 70 shown in Fig. 8. Flow restricting means 87 as in Fig. 11 is designed to provide the maximum degree of restriction required for example in the last tube in the row. Accordingly, tubes near collector inlet 18 have collars in which the central gas passage 88 is of increasingly larger diameter until at the first tube in the row, where flow restriction is at a minimum or zero value, collar 87 may be omitted entirely as shown in Fig. 12.

An extension and combination of the flow restricting means shown in Figs. 11 and 12 can be embodied in the variable diameter outlet tube shown in Fig. 13. In a collecting unit 12 having a separating tube 25 of a given diameter, the degree of flow resistance at the inlet to the collecting unit can be regulated by changing the outside diameter of the outlet tube, thus regulating the size of the annular area 91 between the outlet tube and separating tube 25 through which the gas enters the collecting unit. In a similar manner, the degree of resistance to gas flow at the outlet from the collecting unit can be regulated by regulating the inside diameter of the outlet tube which determines the area of gas passage 92. Assuming that the wall thickness of the outlet tube remains constant, both the inner and outer diameter of the tube then change together.

Fig. 13 shows in horizontal section a typical row of five units in which the first collecting unit, the one nearest the gas inlet, has an outlet tube 90 of maximum diameter, thus leaving a minimum annular area 91 between it and the inside surface of separating tube 25. At the same time gas is leaving the collecting unit through passage 92 inside the tube which is now of the maximum size. The second collecting unit in the row has an outlet tube 90a of slightly smaller diameter which decreases the net area of outlet passage 92 while correspondingly increasing the net area of inlet passage 91. Outlet tubes 90b, 90c and 90d in the third, fourth and fifth collecting units of the row respectively have progressively smaller diameters. This effects progressive decreases in the area of outlet passage 92 with corresponding increases in the pressure drop in the gas stream while flowing through the outlet tube, and progressive increases in the size of inlet passage 91 with corresponding decreases in the pressure drop in the gas while passing through this inlet passage. Hence, both flow restrictions are controlled in a single member having a progressively changing dimension.

Another type of flow restricting means at the outlet from a separating unit is shown in Figs. 8 and 9 in the form of straightening vanes 95 located inside outlet tube 30. As the gas enters the outlet tube, it is moving in a spiral path. By engagement with the upper guiding surfaces of vanes 95, the spiral motion of the gas is decreased and it is returned to a greater or lesser extent to linear movement, depending upon the design and dimensions of the vanes. Since straightening vanes in the outlet tube have the effect of recovering a certain amount of energy and thereby reducing the pressure drop otherwise occurring during flow through the outlet tube, vanes 95 may be regarded as a negative resistance to gas flow in comparison with the positive resistances described previously.

When the trailing edge of each vane 95 makes a small angle 96 with the axis of the outlet tube, the maximum straightening effect is obtained and the gas stream has the lowest pressure drop going through the outlet tube. When this angle is relatively large as at 97, less straightening of the gas flow is accomplished and the pressure drop through the tube is larger.

In all the foregoing description, discussion has been limited to a single row of collecting units extending in the direction of incoming gas flow and comprising only five collecting units. It will be understood that this in no way implies a limitation to this number of units in one row, but only illustrates the principles involved. Each row may contain a larger or smaller number of tubes, as may be necessary or desired. Likewise, it has been assumed that there would be introduced into each successive collecting unit of the row a different degree of flow resistance. This may not be the case as a matter of actual practice. For example, assume a row having ten units 12. In this case it may be found as a matter of expediency that it is undesirable to provide for ten different degrees of flow resistance by adding different resistances at the inlet ends of nine tubes. This would require rings 40 with nine different lengths of legs 41 or nine different sizes of collars such as those shown at 70 in Fig. 8, or vanes with ten different degrees of angularity, as shown in Fig. 10. It might be found, for example, that in the interest of simplicity a satisfactory approximation of equality of pressure drops could be obtained by treating alike successive pairs of units consisting of the first and second units, the third and fourth units, the fifth and sixth units, and so on. This would require no resistance to be introduced at the gas inlets of the first and second collecting units, and introduction of the same resistance into the third and fourth units, and so on for each pair of units. The condition would then be exactly the same as shown in Fig. 2 except that two successive tubes would be treated alike and only four degrees of resistance would then be introduced into the collecting units at their inlet ends.

This treatment of the units does not offer any substantial departure from the method of equalizing flow resistances described above since with the larger number of units in the row, the difference in flow resistance between two successive tubes is relatively less than with a smaller number. While in theory it would be possible to equalize flow through the larger number of units only by introducing a different resistance in each unit to produce ideal conditions, yet as a matter of actual practice small departures from theoretical values may be permitted since other factors may prevent one from reaching ideal conditions.

From the foregoing description it will be understood that various changes may be made in the method of and means for equalizing the resistances to gas flow over a plurality of separate paths in a multiple unit dust collector of the character described. Different means may be employed to introduce this resistance, and the resistance may be introduced at different locations to secure a desired pressure drop at or between selected locations along the path of gas flow. Accordingly, it is to be understood that the foregoing description is considered as being illustrative of, rather than limitative upon, the appended claims.

I claim:

1. In a dust collector having a housing provided with a gas inlet and a gas outlet, the combination comprising: a plurality of similar cyclone-type dust collecting units operating in parallel and each receiving part of the gas entering the collector at said inlet and discharging cleaned gas which flows to said outlet; a dust receiving hopper, each of said collecting units having a dust discharge opening communicating with said hopper; and gas flow restricting means at the inlet of each of selected units, said means providing graded amounts of resistance to flow of the gas flowing through individual units sufficient to equalize the total resistance to flow of gas flowing from said collector inlet to the dust discharge opening of any one of said units.

2. In a dust collector having a housing provided with a gas inlet and a gas outlet, the combination comprising: a plurality of similar cyclone-type dust collecting units operating in parallel and each receiving part of the gas entering the collector at said inlet and discharging cleaned gas which flows to said outlet; a dust receiving hopper, each of said collecting units having a dust discharge opening communicating with said hopper; first gas flow restricting means at the inlet of each of selected units, said means providing graded amounts of resistance to flow of the gas flowing through individual units sufficient to equalize the total resistance to flow of gas flowing from said collector inlet to the dust discharge opening through any one of said units; and second gas flow restricting means at the outlet of each of selected units, said second means providing graded amounts of resistance to flow of the gas flowing through individual units sufficient to equalize the total resistance to flow of gas flowing from the dust discharge opening of any one of said units to said collector outlet.

3. A dust collector as in claim 2 in which the dust collecting units are in a row extending in the direction of gas flow from the collector inlet, and the first mentioned flow resistances decrease progressively in said direction of gas flow, and the second mentioned flow resistances increase progressively in said direction of gas flow.

4. In a dust collector having a housing provided with a gas inlet and a gas outlet, the combination comprising: a plurality of similar cyclone-type dust collecting units operating in parallel and each receiving part of the gas entering the collector at said inlet and discharging cleaned gas which flows to said outlet; a dust receiving hopper, each of said collecting units having a dust discharge opening communicating with said hopper; and gas flow restricting means near the inlet of each of selected units, said means providing graded amounts of resistance to flow of the gas flowing through individual units sufficient to equalize the total resistance to flow of gas flowing from said collector inlet to the dust discharge opening through any one of said units, said restricting means at each unit comprising an annular member at the inlet of the unit adapted to reduce the gas inlet area of the unit.

5. In a dust collector having a housing provided with a gas inlet and a gas outlet, the combination comprising: a plurality of similar cyclone-type dust collecting units each including a separating tube and a concentric outlet tube of smaller diameter extending into the separating tube at the gas inlet end thereof, said units operating in parallel and each receiving a part of the gas entering the collector at said inlet and discharging cleaned gas which flows to said outlet; a dust receiving hopper, each of said collecting units having a dust discharge opening communicating with said hopper; and gas flow restricting means near the inlet of each of selected units, said means providing graded amounts of resistance to flow of the gas flowing through individual units sufficient to equalize the total resistance to flow of gas flowing from said collector inlet to the dust discharge opening of any one of said units, said restricting means at each unit comprising an annular member spaced from the end of the separating tube and surrounding the outlet tube to divide the gas inlet area of the unit into a fixed area and a variable area, and means adjustably spacing the annular member from the end of the separating tube to change the variable area.

6. A dust collector having a housing provided with a gas inlet and a gas outlet and having a plurality of similar cyclone-type dust collecting units, said units operating in parallel and each receiving a part of the gas entering the collector at said inlet and discharging cleaned gas which flows to said outlet, and having also a dust receiving hopper with which each of said collecting units communicates through a dust discharge opening in the unit, in which each collecting unit comprises: a separating tube, an outlet tube of smaller diameter concentric with and at the inlet end of the separating tube, and means at the inlet of each unit imparting a spinning motion to the gas in each unit, said means providing graded amounts of resistance to flow of the gas flowing through individual units sufficient to equalize the total resistance to flow of gas flowing from said collector inlet to the dust discharge opening of any one of said units.

7. A dust collector as in claim 6 in which the means at the inlet of each unit for imparting a spinning motion to the gas comprises a plurality of vanes disposed at an angle with the axis of the separating tube, the vanes in successive units being at progressively different angles with the tube axis to progressively change the resistance to gas flow offered by the vanes in successive units.

8. In a multiple-unit dust collector having a housing provided with a gas inlet and a gas outlet and a plurality of similar cyclone-type dust collecting units all receiving a part of the gas entering the collector through said gas inlet and all discharging cleaned gas which flows to said gas outlet, each collecting unit including a separating tube and a concentric outlet tube of smaller diameter extending into said separating tube at the gas inlet end thereof, the combination in which all separating tubes are of substantially equal diameter and the outlet tubes are of progressively changing diameters whereby the area of the gas outlet passages from the units progressively decreases as the area of the gas inlet passages to the units progressively increases.

9. In a dust collector having a housing provided with a gas inlet and a gas outlet, the combination comprising: a plurality of similar cyclone-type dust collecting units each including a separating tube and a concentric outlet tube of smaller diameter extending into the separating tube at the gas inlet end thereof, said units operating in parallel and each receiving a part of the gas entering the collector at said inlet and discharging cleaned gas which flows to said outlet; a dust receiving hopper, each of said collecting units having a dust discharge opening communicating with said hopper; and gas flow regulating means at the outlet of each of selected units, each said regulating means comprising straightening vanes within the outlet tube adapted to reduce the spinning motion of gas passing through the outlet tube, the trailing edges of the vanes in successive ones of said selected units lying at successively different angles with the axis of the outlet tube to produce graded amounts of resistance to gas flow in said successive units, the resistances being a maximum at the end of the row remote from the gas inlet opening of the housing and decreasing along the row toward said gas inlet opening.

10. In a dust collector having a housing provided with a gas inlet opening and a gas outlet opening, the combination comprising: a plurality of similar cyclone-type dust collecting units arranged in a row extending away from the gas inlet opening, said units operating in parallel and each having an individual inlet receiving part of the gas entering the collector at said gas inlet opening and an individual outlet discharging cleaned gas to said gas outlet opening, and a dust receiving hopper, each of said collecting units having a dust discharge opening communicating with said hopper, and gas flow restricting means at the individual inlet of each of a plurality of selected units, said means providing graded amounts of resistance to flow of the gas flowing through individual units in said row, said resistances being a maximum at the end of the row near the gas inlet opening of the housing and decreasing along said row away from said gas inlet opening.

11. In a dust collector as claimed in claim 10, the combination further comprising: a second gas flow restricting means at the individual outlet of each of a plurality of selected units, said second means providing graded amounts of resistance to flow of the gas flowing through individual units, the resistances of said second means being a maximum at the end of the row remote from the gas inlet opening of the housing and decreasing along the row toward said gas inlet opening.

References Cited in the file of this patent

UNITED STATES PATENTS

| | | |
|---|---|---|
| 1,325,136 | Bradley | Dec. 16, 1919 |
| 2,069,483 | Skajaa | Feb. 2, 1937 |
| 2,209,339 | Knight | June 30, 1940 |
| 2,281,610 | Watson et al. | May 5, 1942 |
| 2,374,715 | White | May 1, 1945 |

FOREIGN PATENTS

| | | |
|---|---|---|
| 687,097 | Great Britain | Feb. 4, 1953 |